Patented Mar. 14, 1944

2,344,389

UNITED STATES PATENT OFFICE 2,344,389

PROCESS FOR THE PREPARATION OF DYE-STUFFS OF THE ANTHRACENIC SERIES

Robert Henri Léon Bretagne, Nogent-sur-Oise, France; vested in the Alien Property Custodian No Drawing. Application April 3, 1941, Serial No. 386,742. In France January 22, 1940

6 Claims. (Cl. 260—264)

It is known that the condensation of 9.10 disulphuric esters of leuco-anthraquinones containing an amino group whether acylated or not, in the beta position, or of the salts of the said esters, can be carried out in an alkaline medium by means of various oxidizing products or salts which have the property of acting as such when passing to a lower valence. The products of the condensation are esters of the N-dihydro-1.2.2'.1' anthraquinone.azine or of its substituted derivatives, which are valuable from the tinctorial point of view, especially in printing.

All oxidizing products up to now proposed have more or less evident disadvantages. Some have an action that is not limited to condensation only, others produce salts which are partially soluble in an alkaline medium, when they have given off one atom of oxygen. These salts contaminate the dyestuff, which necessitates an additional purification.

The present invention has for its object the use of silver oxide as agent for the condensation of the leuco-esters of the 2-amino-anthraquinone and of its substituted products (position 1 remaining free). The oxidizing products used previously, were known condensation agents, such as potassium permanganate, ferric chloride, sodium hypochlorite, potassium ferricyanide, potassium persulphate or lead peroxide. On the contrary, silver oxide has never been used up to now as a condensation agent. Now, according to the invention, it has been found that silver oxide permits not only the condensation of two molecules of di-ester with a sufficient yield, but also the complete recovery of silver, the product of the decomposition of the oxide being completely insoluble in alkaline medium, after reaction.

The oxygen evolved during the reaction does not act upon the organic molecule, but combines itself with the two atoms of hydrogen freed by the reaction, to form water. The beta-amino anthraquinone sulphuric di-ester, or its substituted derivatives, are mild reducing agents of the silver oxide and metallic silver in a granulated state is obtained at the end of the reaction. A silver mirror is not formed at any time, the grey powder adheres slightly to the walls of the vessel in which the condensation takes place and even gets loose at the end of the reaction.

The condensation can be accomplished either with dry silver oxide, or with a recently prepared paste with its ammonical solution, or also with silver oxide formed directly in the mixture which will enter into reaction. In this case, it is possible to start either from soluble or insoluble silver salts, capable of oxidation in an alkaline medium.

All of the silver can be recovered after the reaction, and can easily be transformed into a soluble salt, which permits an easy regeneration of the oxide and the elimination of small proportions of organic products.

The following are nonlimiting examples for the application of the invention.

Example 1

500 parts of water, 20 parts of sodium carbonate and 18 parts of beta-amino-anthraquinone sulphuric di-ester are heated at a temperature of 100° C., and 14 parts of silver oxide are then charged in small equal portions. The temperature is maintained till the end of the transformation, the mixture is cooled, filtered and the silver precipitate is washed. The dyestuff, as tetra-ester, is in solution in the filtrate. It is isolated in the usual manner.

Example 2

450 parts of water, 50 parts of 30% caustic soda and 18 parts of 2.amino.3.chlor.-anthraquinone sulphuric di-ester, are heated at a temperature above 80° C. and 10 parts of silver oxide are gradually charged (as a paste). The temperature of the mixture is maintained a few minutes and the process is then carried out as in Example 1.

Example 3

A solution of 30% of silver nitrate (65 parts) is slowly and regularly poured in a hot solution composed of 450 parts of water, 65 parts of 30% caustic soda and 18 parts of 2.amino.3.chlor.-anthraquinone sulphuric di-ester. The temperature of the mixture is maintained till the end of the reaction. The mixture is filtered after cooling and the dyestuff is isolated in the usual manner.

The silver precipitate is then treated by diluted nitric acid, in hot condition. The solution, filtered in order to eliminate the organic products, can be concentrated in order to recover the salt in a solid state or neutralized and used directly for a new condensation.

Example 4

14 parts of silver chloride, as a paste, are charged gradually in small equal portions, in 400 parts of water, 40 parts of 30% caustic soda and 14 parts of 2.amino.3.chlor.-anthraquinone sulphuric di-ester and heated above 80° C. The temperature is maintained a few minutes and the dyestuff, after cooling and elimination of the silver, is isolated.

Example 5

480 parts of water, 60 parts of 30% caustic soda, 7 parts of 2.amino.3.chlor.-anthraquinone sulphuric di-ester are heated under pressure at 120° C. for 15 minutes. After elimination of the silver, and precipitation by a mineral acid, the dyestuff gives a blue shade in the vat dyeing.

Example 6

In a solution, maintained at a temperature above 80° C., which contains 400 parts of water, 32 parts of 30% caustic soda and 7 parts of 2. amino.3.chlor.anthraquinone sulphuric di-ester, is poured a solution prepared with 100 parts of water, 17 parts of 30% caustic soda, 10 parts of silver nitrate and 20 parts of 25% ammonia. The isolation of the dyestuff is carried out as in the preceeding examples.

What I claim is:

1. A process for the preparation of dyestuffs of the anthracenic series, by condensation, in an alkaline medium, of a compound of the group consisting of the 9-10 sulphuric di-esters of the beta-amino-leuco-anthraquinones, of the beta-acyl-amino-leuco-anthraquinone and of their halogenated derivatives in positions other than position 1, in which silver oxide is caused to act as condensation agent.

2. A process for the preparation of dyestuffs of the anthracenic series, by condensation, in an alkaline medium, of a compound of the group consisting of the 9-10 sulphuric di-esters of the beta-amino-leuco-anthraquinones, of the beta-acyl-amino-leuco-anthraquinone and of their halogenated derivatives in positions other than position 1, in which pasty recently prepared silver oxide, is caused to act as condensation agent.

3. A process for the preparation of dyestuffs of the anthracenic series, by condensation, in an alkaline medium, of a compound of the group consisting of the 9-10 sulphuric di-esters of the beta-amino-leuco-anthraquinones, of the beta-acyl-amino-leuco-anthraquinone, and of their halogenated derivatives in positions other than position 1 in which an ammoniacal solution of silver oxide, is caused to act as condensation agent.

4. A process according to claim 1, in which the silver oxide is formed in the reaction medium from a silver salt able to form silver oxide in an alkaline medium.

5. A cyclic process for the preparation of dyestuffs of the anthracenic series which comprises the steps of condensing in an alkaline medium a compound of the group consisting of the 9-10 sulphuric di-esters of the beta-amino-leuco- anthraquinones, of the beta-acyl-amino-leuco-anthraquinone and of their halogenated derivatives in positions other than position 1, causing silver oxide to act as condensation agent, recovering the silver present in the reaction products forming silver oxide from the so recuperated silver, and using the said silver oxide for the condensation of a further quantity of a compound of the group consisting of the 9-10 sulphuric di-esters of the beta-amino-leuco-anthraquinones and of their substituted derivatives.

6. A cyclic process for the preparation of dyestuffs of the anthracenic series which comprises the steps of condensing in an alkaline medium a compound of the group consisting of the 9-10 sulphuric di-esters of the beta-amino-leuco-anthraquinones, of the beta-acyl-amino-leuco-anthraquinone and of their halogenated derivatives in positions other than position 1 in presence of a silver salt able to form silver oxide in an alkaline medium, recovering the silver present in the reaction products, forming by means of the said silver a silver salt able to form silver oxide in an alkaline medium, and using the said silver salt for the condensation of a further quantity of a substance of the group consisting of the 9-10 sulphuric di-esters of the beta-amino-leuco-anthraquinones and of their substituted derivatives.

ROBERT HENRI LÉON BRETAGNE.